US011334391B2

(12) United States Patent
Chen et al.

(10) Patent No.: US 11,334,391 B2
(45) Date of Patent: May 17, 2022

(54) SELF-PROGRAMMABLE AND SELF-TUNABLE RESOURCE SCHEDULER FOR JOBS IN CLOUD COMPUTING (71) Applicant: Red Hat, Inc., Raleigh, NC (US)

(72) Inventors: Huamin Chen, Westford, MA (US); Jay Vyas, Boston, MA (US)

(73) Assignee: RED HAT, INC., Raleigh, NC (US)

( * ) Notice: Subject to any disclaimer, the term of this patent is extended or adjusted under 35 U.S.C. 154(b) by 51 days.

(21) Appl. No.: 15/489,197

(22) Filed: Apr. 17, 2017

(65) Prior Publication Data

US 2018/0300176 A1 Oct. 18, 2018

(51) Int. Cl.
*G06F 9/48* (2006.01)
*G06F 9/50* (2006.01)
*G06F 11/34* (2006.01)
*G06F 15/16* (2006.01)

(52) U.S. Cl.
CPC .......... *G06F 9/5072* (2013.01); *G06F 9/4887* (2013.01); *G06F 9/5027* (2013.01); *G06F 9/4881* (2013.01); *G06F 9/505* (2013.01); *G06F 9/5011* (2013.01); *G06F 9/5077* (2013.01); *G06F 11/3442* (2013.01); *G06F 15/161* (2013.01)

(58) Field of Classification Search
None
See application file for complete search history.

(56) References Cited

U.S. PATENT DOCUMENTS

| 5,640,563 A * | 6/1997 | Carmon | G06F 9/4887 |
| | | | 718/102 |
| 7,680,933 B2 * | 3/2010 | Fatula, Jr. | G06F 9/5072 |
| | | | 709/226 |
| 7,897,225 B2 * | 3/2011 | Campbell | B29C 61/10 |
| | | | 428/36.5 |
| 8,082,547 B1 * | 12/2011 | Herington | G06F 9/5077 |
| | | | 705/59 |

(Continued)

FOREIGN PATENT DOCUMENTS

WO WO-2012071930 A1 * 6/2012 ............ H04W 16/10

OTHER PUBLICATIONS

Ishai Menache, Ohad Shamir, Navendu Jain, Microsoft Research ; Weizmann Institute, On-demand, Spot, or Both: Dynamic Resource Allocation for Executing Batch Jobs in the Cloud, 2016, microsoft.com/en-us/research/wp-content/uploads/2016/02/ICAC2014_TR_new.pdf.

(Continued)

*Primary Examiner* — Abu Zar Ghaffari
(74) *Attorney, Agent, or Firm* — Haynes and Boone, LLP (57) ABSTRACT A method of adjusting a set of resources allocated for a job includes analyzing, by a job tuning module, an intermediate result of a job. Processing the job includes processing a first iteration of a task and a second iteration of the same task. Additionally, the intermediate result is a result of the first iteration of the task, and the job is allocated a first set of resources during processing of the first iteration of the task. The method also includes sending a notification to a scheduler that causes the scheduler to adjust the first set of resources allocated to the job to a second set of resources for processing the second iteration of the task. The job may be allocated the second set of resources during processing of the second iteration of the task.

20 Claims, 6 Drawing Sheets (56) References Cited

U.S. PATENT DOCUMENTS

| | | | |
|---|---|---|---|
| 8,423,728 B1* | 4/2013 | Yu | G06F 3/0613 |
| | | | 711/100 |
| 8,621,477 B2 | 12/2013 | Ferdous et al. | |
| 8,997,107 B2 | 3/2015 | Jain | |
| 9,009,294 B2 | 4/2015 | Dawson et al. | |
| 9,268,607 B2 | 2/2016 | Jackson | |
| 9,342,368 B2* | 5/2016 | Sahu | G06F 9/5077 |
| 9,417,913 B2 | 8/2016 | Booman et al. | |
| 9,740,526 B2* | 8/2017 | Majewski | G06F 9/4881 |
| 9,846,600 B1* | 12/2017 | Williams | G06F 9/5061 |
| 10,002,029 B1* | 6/2018 | Bequet | G06F 9/5083 |
| 10,026,070 B2* | 7/2018 | Thorpe | H04L 47/823 |
| 10,075,344 B2* | 9/2018 | Fang | H04L 67/34 |
| 10,193,762 B2* | 1/2019 | Poort | H04L 41/147 |
| 10,331,481 B2* | 6/2019 | Ahmed | G06F 11/3006 |
| 10,394,597 B1* | 8/2019 | Kowalski | G06F 9/4887 |
| 2007/0143765 A1* | 6/2007 | Aridor | G06F 9/5011 |
| | | | 718/104 |
| 2008/0022284 A1* | 1/2008 | Cherkasova | G06F 9/4881 |
| | | | 718/104 |
| 2008/0040190 A1* | 2/2008 | Khosla | G06F 9/4881 |
| | | | 705/7.22 |
| 2009/0007114 A1* | 1/2009 | Riddick | G06F 11/30 |
| | | | 718/100 |
| 2010/0050161 A1* | 2/2010 | Nir-Buchbinder | G06F 9/52 |
| | | | 717/126 |
| 2010/0115523 A1* | 5/2010 | Kuschel | G06Q 10/06 |
| | | | 718/103 |
| 2011/0138055 A1* | 6/2011 | Daly | G06F 9/505 |
| | | | 709/226 |
| 2012/0096468 A1* | 4/2012 | Chakravorty | G06F 9/50 |
| | | | 718/103 |
| 2012/0122505 A1* | 5/2012 | Dotzler | H04W 28/16 |
| | | | 455/509 |
| 2012/0198466 A1* | 8/2012 | Cherkasova | G06F 9/5066 |
| | | | 718/104 |
| 2013/0091282 A1* | 4/2013 | Tontiruttananon | G06F 9/5061 |
| | | | 709/226 |
| 2013/0104137 A1* | 4/2013 | Fukuzaki | G06F 9/4887 |
| | | | 718/102 |
| 2013/0151707 A1* | 6/2013 | Boutin | G06F 9/5027 |
| | | | 709/226 |
| 2013/0212277 A1* | 8/2013 | Bodik | G06F 9/4887 |
| | | | 709/226 |
| 2013/0290972 A1* | 10/2013 | Cherkasova | G06F 9/5066 |
| | | | 718/103 |
| 2014/0052877 A1 | 2/2014 | Mao | |
| 2014/0229221 A1* | 8/2014 | Shih | G06Q 10/06312 |
| | | | 705/7.23 |
| 2015/0019737 A1 | 1/2015 | Kim et al. | |
| 2015/0169369 A1* | 6/2015 | Baskaran | G06F 9/4881 |
| | | | 718/102 |
| 2015/0261577 A1* | 9/2015 | Gilbert | G06F 9/5077 |
| | | | 718/1 |
| 2015/0371354 A1* | 12/2015 | Petersen | G06T 1/20 |
| | | | 345/522 |
| 2016/0203024 A1* | 7/2016 | Choi | G06F 9/5027 |
| | | | 718/1 |
| 2016/0226955 A1* | 8/2016 | Moorthi | G06Q 10/06 |
| 2017/0102969 A1* | 4/2017 | Kochunni | G06F 9/5011 |
| 2017/0109206 A1* | 4/2017 | Wang | G06F 9/5005 |
| 2017/0109207 A1* | 4/2017 | Li | G06F 9/50 |
| 2017/0185947 A1* | 6/2017 | Zhou | G06Q 10/063118 |
| 2017/0255491 A1* | 9/2017 | Bradshaw | G06F 9/5016 |
| 2018/0143852 A1* | 5/2018 | Ballantyne | G06F 9/5027 |
| 2018/0181445 A1* | 6/2018 | Bequet | G06F 9/5083 |
| 2019/0042221 A1* | 2/2019 | Krishnaiyer | G06F 8/45 |
| 2019/0310864 A1* | 10/2019 | Gutierrez | G06F 9/44505 |

OTHER PUBLICATIONS

Sameer M. Khupse, Himanshu U Joshi, Department of Computer, Imperial College of Engineering and Research, Pune, Savitribai Phule Pune, University, Pune India, Survey on Hadoop Performance Using Dynamic Job Ordering and Slot Configuration Approach Using Mapreduce. 2016, ijircce.com/upload/2016/december/229_Sameer_survey%20Paper%20_1_.pdf.

Gunho Lee, Electrical Engineering and Computer Sciences, University of California at Berkeley, Resource Allocation and Scheduling in Heterogeneous Cloud Environments, May 10, 2012, igitalassets.lib.berkeley.edu/techreports/ucb/text/EECS-2012-78.pdf.

* cited by examiner

SELF-PROGRAMMABLE AND SELF-TUNABLE RESOURCE SCHEDULER FOR JOBS IN CLOUD COMPUTING

BACKGROUND

The present disclosure generally relates to computing devices, and more particularly to adjusting resources allocated to a job.

The advent of cloud-based computing architectures has opened new possibilities for the rapid and scalable deployment of services. In general, a cloud-based architecture deploys a set of hosted resources such as processors, operating systems, software and other components that can be combined together to form virtual machines. A user can request one or more resources (e.g., the instantiation of a virtual machine, a processor, a server, a database, or a set of machines from those resources) from a central server or cloud management system to perform intended tasks, services, or applications. The user can subscribe to the set of resources in order to build and run a set of instantiated virtual machines on a comparatively short-term basis, such as minutes, hours, or days, for the user's intended application.

BRIEF SUMMARY

Methods, systems, and techniques for adjusting a set of resources allocated for a running job are provided.

An example method of adjusting a set of resources allocated for a job includes analyzing, by a job tuning module, an intermediate result of a job. The intermediate result is a result of a first iteration of a task, and the job is allocated a first set of resources during processing of the first iteration of the task. The method also includes sending a notification to a scheduler that causes the scheduler to adjust the first set of resources allocated to the job to a second set of resources for processing a second iteration of the task. Processing the job includes processing the first and second iterations of the task.

An example system for adjusting a set of resources allocated for a job includes a scheduler that allocates from a cloud provider a set of resources for a job. Processing the job includes processing N iterations of a task. The system also includes a job tuning module that analyzes an intermediate result of the job and determines, based on the intermediate result, whether a deadline for the job will be satisfied if a current set of resources allocated for the job is allocated for a subsequent iteration of the N iterations. The intermediate result is a result of a first iteration of the task. The system further includes a job tuning service that in response to a determination that the deadline for the job will not be satisfied if the current set of resources allocated for the job is allocated for the subsequent iteration, sends a notification to the scheduler to adjust the current set of resources allocated to the job for use in the subsequent iteration.

An example machine-readable medium includes a plurality of machine-readable instructions that when executed by one or more processors is adapted to cause the one or more processors to perform a method including: analyzing, by a job tuning module, an intermediate result of a job, the intermediate result being a result of a first iteration of a task, and the job being allocated a first set of resources during processing of the first iteration of the task; and sending a notification to a scheduler that causes the scheduler to adjust the first set of resources allocated to the job to a second set of resources for processing a second iteration of the task, where processing the job includes processing the first and second iterations of the task.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

I. Overview
II. Example Computer Architecture
III. Example Process Flow
  A. Dispatch Job
  B. Register Job Tuning Module with Job Turning Service
  C. Job Run
    1. Initiate Processing of a Job
    2. Analyze One or More Intermediate Results of the Job
    3. Adjust a Set of Current Resources Allocated to the Running Job
IV. Example Methods
I. Overview It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A user may use the physical and/or virtual resources offered by a cloud provider to process jobs. The user may submit a compute job request to a scheduler that interacts with the cloud provider. The compute job request may cause the job to be processed and a final result of the job returned to the user. Typically, when cloud users dispatch their compute jobs, they estimate the amount of resources their jobs should be allocated, and make a one-time claim for these resources. Once a job starts executing in the cloud, the resources allocated to the job do not change, even in the event of resource underutilization or overutilization.

Additionally, some jobs may be highly parallel and iterative in nature. For example, a job may be run in a repeatable pattern over time. The performance of such a job is sensitive to resource availability. In an example, the job is a machine learning job that predicts an amount of resources and the type of resources (e.g., how many processors or virtual machines) that should be used to satisfy a deadline or the criteria for the successful completion of a job, per iteration. The execution of a job may produce intermediate results. Processing such a job may include processing multiple iterations of a task, with different intermediary results being produced per iteration. Each of the intermediate results may be used to produce a final result of the job. The time that it takes to complete a first iteration of the task may be noted, and determined to be too long. In this example, it may be advantageous to accelerate this process for subsequent iterations of the task and thus allocate more resources. A resource claim for a batch job is programmable, but typically before the job starts executing.

Static resource claims, however, do not offer the same level of economics and performance tuning capability as dynamic resource claims. The problem of static resource claims may be solved by providing a mechanism for dynamically adjusting the resources allocated for a running job. It may be advantageous to optimize this process of allocating resources for the job. In particular, it may be advantageous to provide a mechanism for adjusting (e.g., increasing and/or decreasing) the amount of resources allocated to a job after it has started executing, but before it completes execution. The present disclosure analyzes one or more intermediate results of a job, monitors its execution, and adjusts resources allocated to the job such that a subsequent iteration of the task uses a different amount of resources than the previous iteration.

Unless specifically stated otherwise, as apparent from the following discussion, it is appreciated that throughout the description, discussions utilizing terms such as "determining," "storing," "analyzing," "receiving," "sending," "allocating," "executing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

II. Example Computer Architecture

Figure 1:
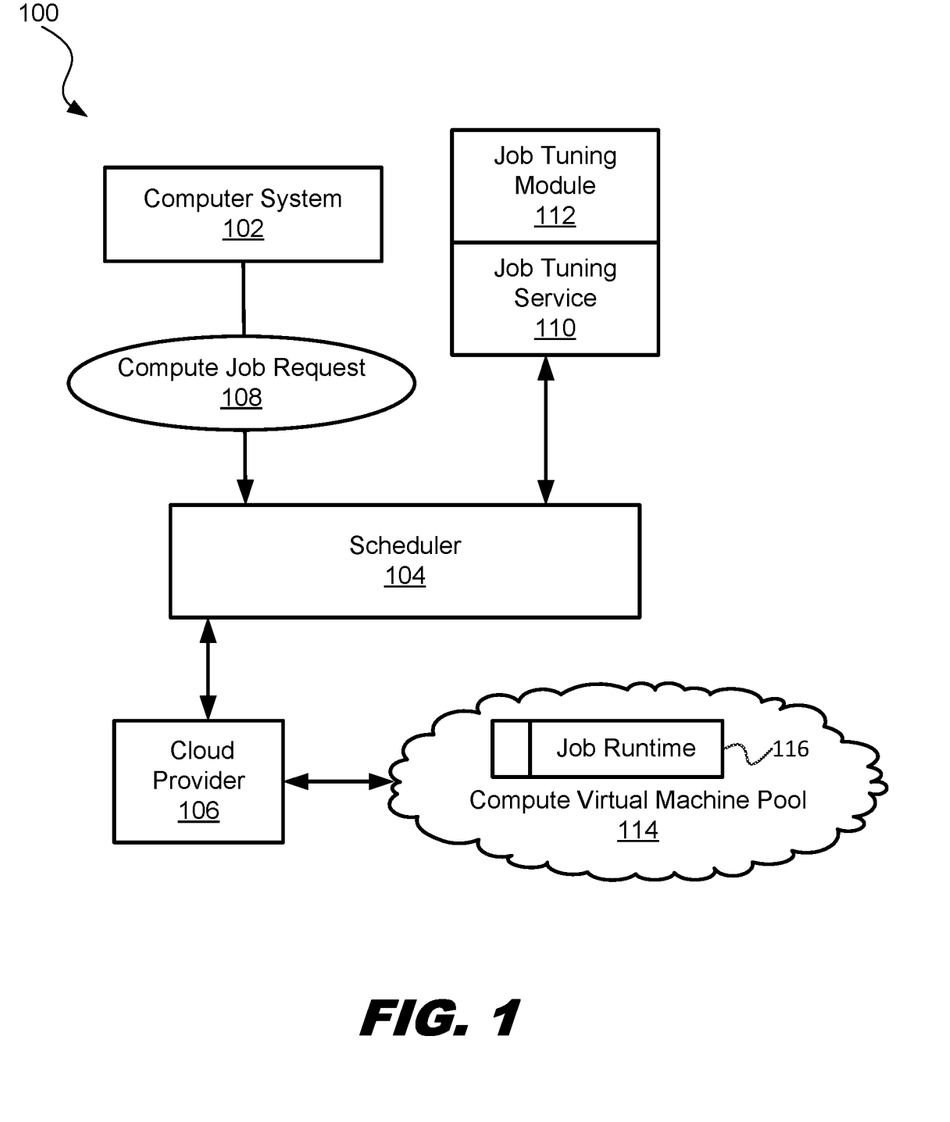
FIG. 1 is a diagram illustrating an example system for adjusting a set of resources allocated for a job.

FIG. 1 is a diagram illustrating an example system 100 for adjusting a set of resources allocated for a job. System 100 may be used for processing a job that is iterative in nature. For example, processing of the job may include processing multiple iterations of the same task to achieve a final result. As will be explained further below, system 100 empowers compute jobs to fine-tune their resource claims based on intermediate results of the job.

System 100 includes a computer system 102, a scheduler 104, and a cloud provider 106 that may be coupled over a network (not shown). The network may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Computer system 102 is coupled to hardware such as a processor for executing software (e.g., machine-readable instructions) and using or updating data stored in a memory. The hardware may include one or more processors. A "processor" may also be referred to as a "CPU" or "physical processor" herein. A processor shall refer to a device capable of executing instructions encoding arithmetic, logical, or I/O operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

The memory may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The hardware may include other input/output (I/O) devices.

A user may submit a compute job request 108 to scheduler 104, which may allocate one or more physical and/or virtual resources provided by cloud provider 106. A user may use computer system 102 for submitting the jobs. In the present disclosure, reference to a user submitting a job or compute job request may be interpreted as the user interacting with computer system 102 to submit the job or compute job request. For example, the user may submit a job or compute job request by providing user input (e.g., via a keyboard or mouse input) requesting that a particular job be processed, and in response to the user input, computer system 102 may submit a job or compute job request.

A user may point a browser (not shown) hosted on computer system 102 to a Website associated with cloud provider 106 to request one or more resources. Cloud provider 106 may allocate the requested resources and provide them to a job. Cloud provider 106 may provide a resource to the job by providing it with information about the resource. For example, if cloud provider 106 allocates a virtual machine to the job, cloud provider 106 may provide the job with the Internet Protocol (IP) address of the machine hosting the virtual machine, location of the virtual machine, etc. In another example, a cloud provider 106 may expose an API that when invoked causes cloud provider 106 to allocate resources for processing one or more jobs. A user and/or job tuning service 110 may request one or more resources for a job by invoking the API and receive information about the resource based on the invocation of the API. Job tuning service 110 may pass the resource information to the job. A resource may be a processor, server, virtual machine, etc.

Cloud provider 106 may expose one or more interfaces, and an entity may communicate with an interface to control the allocation of resources for a job. Scheduler 104 may allocate resources in a cloud environment using, for example, the interface. Although scheduler 104 is shown as being separate from computer system 102, it should also be understood that in some examples, scheduler 104 is incorporated into computer system 102. In an example, scheduler 104 allocates from compute virtual machine pool 114 a set of resources for a job. Cloud computing services can provide computational capacity, data access, networking/routing and storage services via a large pool of shared resources operated by cloud provider 106. In the example illustrated in FIG. 1, cloud provider 106 provides a computer virtual machine pool 114 that includes resources for processing a job. Because the computing resources are delivered over a network, cloud computing is location-independent computing, with resources being provided to end-users on demand with control of the physical resources separated from control of the computing resources. A computing resource may include networks for transfer, servers for storage, and/or applications or services for processing jobs. Cloud provider 106 may provide computing resources on an on-demand basis with the flexibility to bring the resources up or down through automation or with little intervention.

Figure 2:
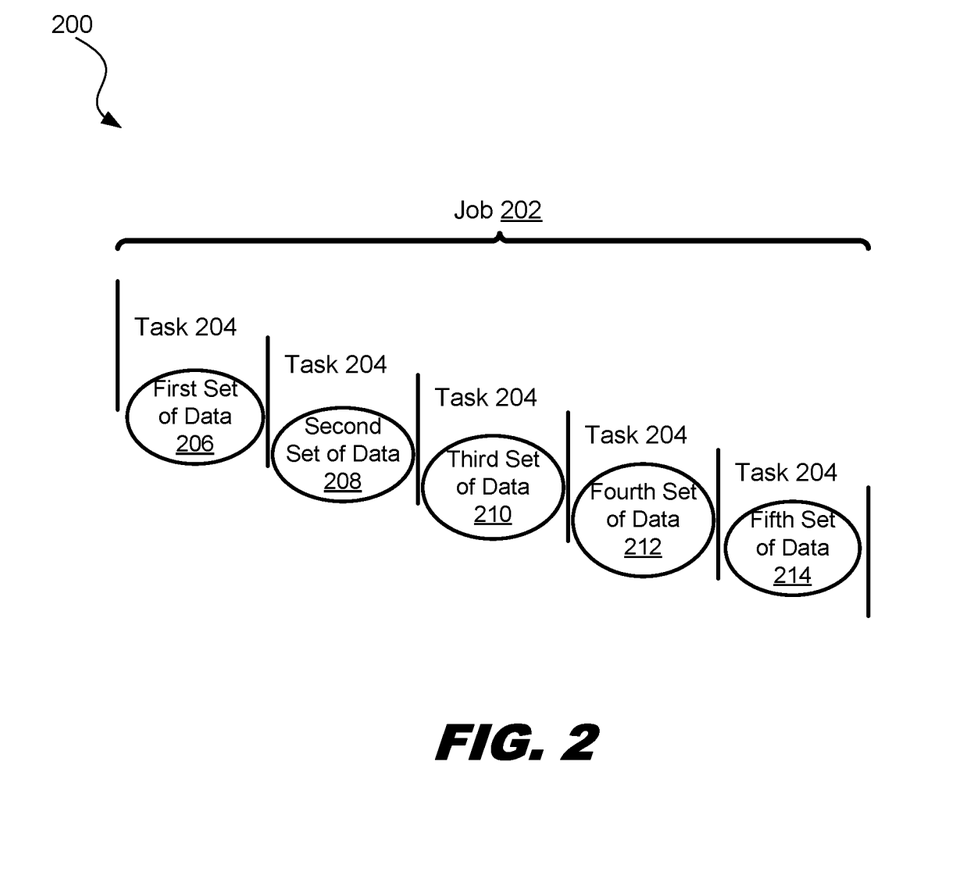
FIG. 2 is an example of a job.

FIG. 2 is an example of a job 202, which includes processing iterative tasks. FIGS. 1 and 2 will be discussed together to better understand the processing of the job. Processing of job 202 may include processing a common task 204 a multiple number of times. The iterations may process different sets of data, but use the same logic to compete the task. A first iteration of task 204 processes a first set of data 206, a second iteration of task 204 processes a second set of data 208, a third iteration of task 204 processes a third set of data 210, a fourth iteration of task 204 processes a fourth set of data 212, and a fifth iteration of task 204 processes a fifth set of data 214. First set of data 206 may be different from second set of data 208. A first set of resources allocated to job 202 and used for processing the first iteration of task 204 may be different from a second set of resources allocated to job 202 and used for processing the second iteration of task 204. The second iteration of the task may run subsequent to the first iteration of the task.

In an example, job 202 includes uploading 100 photos. In this example, job 202 may include processing five iterations of task 204, with each iteration resulting in the upload of 20 photos. In another example, job 202 includes a user's interaction with a map stored in digital format, with each iteration displaying different portions of the map on a screen as the user zooms in or out.

Referring back to FIG. 1, job tuning module 112 is coupled to a job tuning service 110. In an example, job tuning service 110 is a Web service that is accessible via the Internet by computer system 102, and job tuning module 112 is an executable that "sits" behind job tuning service 110. Job tuning module 112 may listen to and create content based on interactions between computer system 102 and job tuning service 110. In the present disclosure, even if a job is not currently executing on a processor, the job may still be considered "running" or "executing" if it has started executing, but has not yet finished. During execution of job 202, intermediate results of the job may be produced. The job may publish one or more intermediate results to job tuning service 110. In an example, jobs run in computer virtual machine pool 114. Once a job is dispatched to compute virtual machine pool 114, the job has access to endpoint information of job tuning service 110 and may publish intermediate results to this endpoint.

Job tuning service 110 invokes job tuning module 112 to analyze the one or more intermediate results. Job tuning module 112 provides a mechanism for jobs to dynamically adjust their resource claims based on their performance and cost profiles, providing flexibility regarding resources allocated for a job. In particular, the resources allocated for job 202 may be fine-tuned after one or more iterations of task 204. Job tuning module 112 monitors and understands a job's progress and/or status. In an example, job tuning module 112 is specific to the job. In another example, job tuning module 112 is generically used for multiple jobs. The same programmer may program both the job and job tuning module 112 and provide them to the user. Job tuning module 112 understands the job and its deadlines, and may adjust the resources allocated to the job during its execution in order to satisfy the job requirements. The deadline may be timeframe specified by a user. In an example, the deadline is 10 minutes.

Job tuning module 112 determines, based on an intermediate result of the job, whether to adjust (e.g., increase or decrease) the resources currently allocated to the job. The updated set of resources allocated to the job will be used in a subsequent iteration of the task. In an example, job tuning module 112 receives user input specifying one or more conditions for adjusting the set of resources allocated for the job, and at least one condition is based on one or more intermediate results of the job. In an example, a user may declare in job tuning module 112 how to adjust the resource claims based on intermediate results. Job tuning module 112 notifies job tuning service 110 regarding whether to adjust the resources allocated to the job. In turn, job tuning service 110 instructs scheduler 104 to adjust the resources accordingly. In response, scheduler 104 adjusts the allocation of resources for the job accordingly by allocating and/or de-allocating one or more resources from compute virtual machine pool 114 for a job runtime 116. Cloud provider 106 provides the resources in compute virtual machine pool 114 to users.

III. Example Process Flow

Figure 3:
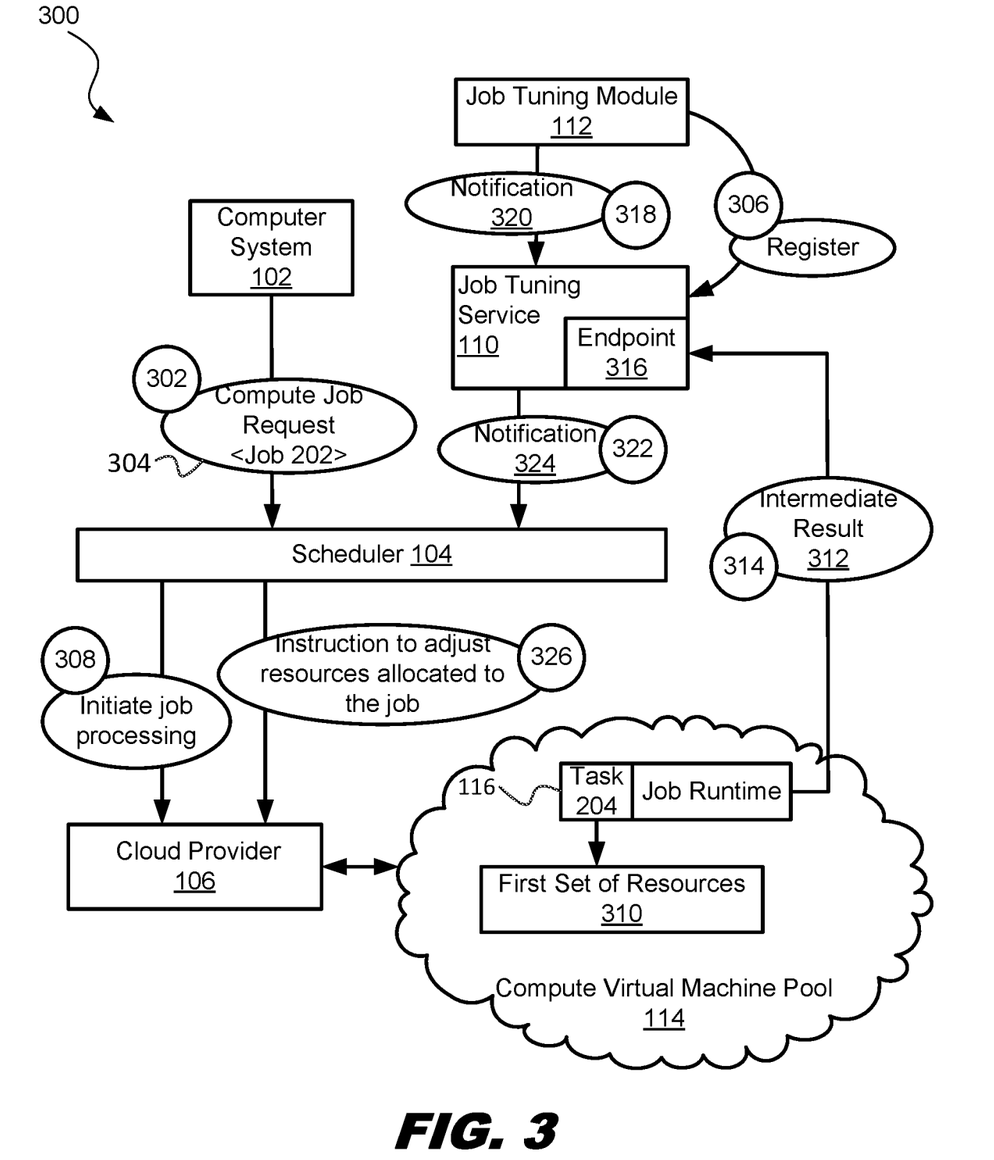
FIG. 3 is an example process flow for adjusting the set of resources for the running job.

FIG. 3 is an example process flow 300 for adjusting a set of resources allocated for a running job. The resources allocated for the job may change between task iterations before the job has finished.

A. Dispatch Job

At an action 302, the user sends a compute job request 304 specifying job 202 to scheduler 104. Compute job request 304 is a request to process job 202, which may communicate with job tuning module 112 to adjust the resources allocated to itself based on a variety of configurable criteria. The processing of job 202 may include processing N iterations of task 204, where N is a whole number greater than one. An intermediate result of job 202 may include a result of an iteration of task 204 along with information corresponding to the processing of the task.

Compute job request 304 may specify job 202 and/or job tuning module 112. In an example, the processing logic of job 202 and/or job tuning module 112 is/are stored at computer system 102 and included in compute job request 304. The user may download job tuning module 112 from a remote server. In another example, processing logic of job 202 is stored at a device different from computer system 102, and compute job request 304 includes a job identifier (ID) that identifies job 202. In another example, processing logic of job tuning module 112 is stored at a device different from computer system 102, and compute job request 304 includes a module identifier (ID) that identifies job tuning module 112.

B. Register Job Tuning Module with Job Tuning Service

At an action 306, job tuning module 112 registers with job tuning service 110. In an example, job tuning module 112 is dispatched directly to job tuning service 110. Registration of job tuning module 112 with job tuning service 110 may include associating job tuning module 112 with job 202. In an example, job 202 and job tuning module 112 are provided by the same entity.

Job tuning service 110 may maintain a database (not shown) including entries that associate a job identified by a particular job ID with a job tuning module identified by a particular module ID. In such an example, if job tuning service 110 receives a job ID and an intermediate result of a job identified by the job ID, job tuning service 110 is able to search the database and identify the job tuning module 112 corresponding to the job. As will be explained further in the present disclosure, job tuning service 110 invokes this particular job tuning module 112 to analyze the intermediate results published by the job to determine its progress and whether to adjust the current resources allocated for the job.

C. Job Run

1. Initiate Processing of a Job

At an action 308, scheduler 104 initiates the processing of job 202. In an example, scheduler 104 initiates the processing of job 202 by allocating initial resources to the job, dispatching the job to computer virtual machine pool 114, and specifying the job tuning module 112 associated with job 202 to cloud provider 106. Scheduler 104 may specify job tuning module 112 to cloud provider 106 by creating and passing the job tuning service 110's endpoint information along with a module ID that identifies job tuning module 112 to the cloud provider.

In the example illustrated in FIG. 3, scheduler 104 allocates first set of resources 310 from compute virtual machine pool 114 to the job. In particular, job 202 is allocated first set of resources 310 during processing of the first iteration of task 204. The resources allocated to job 202 may change such that the resources allocated to the job during processing of the second iteration of task 204 may be different from first set of resources 310. A result of processing the first iteration of task 204 may be an intermediate result 312 of job 202. In this example, intermediate result 312 is a result of a first iteration of task 204.

At an action 314, job 202 publishes intermediate result 312 to an endpoint 316 of job tuning service 110. In an example, endpoint 316 is a uniform resource locator (URL) that references job tuning service 110. Job tuning service 110 may expose endpoint 316 to jobs that are running in compute virtual machine pool 114 such that the jobs may publish one or more intermediate results to the job tuning service. In an example, task 204 publishes its result to an endpoint of job tuning service 110.

2. Analyze One or More Intermediate Results of the Job

Job tuning service 110 invokes the job tuning module corresponding to the job specified in intermediate result 312 to analyze the intermediate result. Job tuning module 112 analyzes one or more intermediate results together with their schema to determine whether to adjust the resources allocated to job 202. Job tuning module 112 may notify job tuning service 110 to increase, decrease, and/or maintain the current resources allocated to the job. In an example, processing job 202 includes processing N iterations of task 204.

In an example, job tuning module 112 determines that a set of resources currently allocated to the first iteration of task 204 is insufficient to complete the job in accordance with a deadline, and accordingly notifies job tuning service 110 to instruct scheduler 104 to increase the resources allocated to the job. In another example, job tuning module 112 determines that the set of resources currently allocated to the first iteration of task 204 is sufficient to complete the job in accordance with the deadline, and accordingly notifies job tuning service 110 to instruct scheduler 104 to decrease the resources allocated to the job. Alternatively, job tuning module 112 may notify job tuning service 110 to instruct scheduler 104 to maintain the same level of resources allocated to the job, or may not send a notification to job tuning service 110 at all.

Job tuning module 112 analyzes intermediate result 312 of job 202 and determines, based on intermediate result 312, whether a deadline for job 202 will be satisfied if a current set of resources (e.g., first set of resources 310) is allocated for one or more remaining iterations (e.g., a subsequent iteration of the N iterations) of the task. In some examples, intermediate result 312 of job 202 includes the job ID of job 202, a completed percentage of the job (e.g., a percentage of the N iterations completed), a processing time for completion of the corresponding iteration (e.g., the first iteration of task 204), start and end timestamps for processing the corresponding iteration, a number of resources (e.g., servers, processors, virtual machines) used to process the corresponding iteration, a deadline for the job, and/or other information regarding processing of the job. An intermediate result corresponds to a particular iteration if the intermediate result is a result of processing the iteration. A schema may specify an order in which task information is ordered in the intermediate result. For example, the schema may specify that the job ID is the first parameter in the intermediate result.

Job tuning module 112 may be able to determine how many more iterations of task 204 are to be processed before job 202 is finished processing. Job tuning module 112 may determine whether the deadline for job 202 will satisfied in a variety of ways. In an example, job tuning module 112 determines whether a completed percentage of job 202 based on previous iterations is below a threshold. Job tuning module 112 may also determine a processing time for completion of the first iteration of task 204. Based on various factors (e.g., the completed percentage is below the threshold, percentage of the N iterations completed and/or the processing time for completion of a current iteration of the task), job tuning module 112 may determine that the deadline for job 202 will not be satisfied if first set of resources 310 is allocated for the one or more remaining iterations (e.g., the subsequent iteration of the N iterations) of task 204. In this example, job tuning module 112 may anticipate that these newly allocated resources can accelerate job execution. Additionally, job tuning module 112 may estimate, based on the intermediate result, an amount of time that would elapse for processing the one or more remaining iterations of the task, and determine whether the amount of time that would elapse satisfies the deadline.

3. Adjust a Set of Current Resources Allocated to the Running Job

At an action 318, job tuning module 112 sends a notification 320 to job tuning service 110. Job tuning service 110 receives notification 320, which provides information on whether the resources currently allocated to job 202 should be adjusted for a subsequent iteration of the task. In an example, notification 320 notifies job tuning service 110 of a determination of whether the deadline for job 202 will be satisfied if the current set of resources allocated for the job is allocated for a subsequent iteration of the task corresponding to the job. The current set of resources may refer to the set of resources currently allocated for the job.

At an action 322, job tuning service 110 sends a notification 324 to scheduler 104, which causes scheduler 104 to adjust first set of resources 310 to a second set of resources for processing a subsequent iteration of task 204. Scheduler 104 receives notification 324, which is based on notification 320.

At an action 326, scheduler 104 sends an instruction to adjust the resources allocated to job 202 to cloud provider 106, which may then allocate or de-allocate the appropriate resources for the job in accordance with the instruction. The first set of resources 310 allocated to job 202 and used for processing the first iteration of task 204 may be different from the second set of resources allocated to job 202 and used for processing the subsequent iteration of task 204.

In some examples, processing job 202 may include processing at least first and second iterations of task 204. In response to a determination that the deadline for job 202 will not be satisfied if first set of resources 310 is allocated for one or more remaining iterations of task 204 (e.g., the second iteration), notification 320 may be a notification to increase a first quantity of resources of a first type (e.g., processors, virtual machines, storage devices, etc.) included in first set of resources 310 to a second quantity of resources of the first type. The one or more "remaining" iterations refer to iterations that are to be completed before the job has finished processing. Alternatively, in response to a determination that the deadline for job 202 will be satisfied if first set of resources 310 is allocated for one or more remaining iterations of task 204, notification 320 may be a notification to decrease (or maintain) a first quantity of resources of a first type included in first set of resources 310 to a second quantity of resources of the first type. Job 202 is allocated the second set of resources of the first type during processing of the second iteration of task 204.

In some examples, first set of resources 310 includes a first quantity of resources of a first type, and the second set of resources includes a second quantity of resources of the first type. In an example, the first quantity is not greater than the second quantity if the deadline for job 202 will not be satisfied if first set of resources 310 is allocated to the job for the second iteration of task 204. In another example, the first quantity is greater than or equal to the second quantity if the deadline for job 202 will be satisfied if first set of resources 310 is allocated to the job for the second iteration of task 204.

In an example, a current set of resources is allocated for job 202 and used in the first iteration of task 204. The current set of resources includes a first quantity of resources of a first type. Notification 320 may provide a notification to allocate a second quantity of resources of the first type to job 202 for the second (or subsequent) iteration. In this example, job 202 may be allocated the first and second quantities of the first type during processing of the second iteration.

It should be understood that additional actions may be performed before, during, or after actions 302, 306, 308, 314, 318, 322, and/or 326 discussed above. In an example, cloud provider 106 receives the instruction from scheduler 104 to adjust resources allocated to job 202 and does so accordingly. The user and/or scheduler 104 may receive sufficient information regarding these resources (e.g., virtual machine ID, etc.) to use the one or more resources for processing one or more jobs.

Additionally, it should be understood that actions 302, 306, and/or 308 may be executed for each job that is run in compute virtual machine pool 114. Additionally, actions 314, 318, 322, and/or 326 may be executed for each intermediate result that is produced after an iteration of the task. In an example, during execution of job 202, job may produce a second intermediate result that the job publishes to endpoint 316 of job tuning service 110. Job tuning service 110 may invoke job tuning module 112 to analyze the second intermediate result of job 202. In this example, the second intermediate result is a result of the second iteration of task 204, and the job is allocated the second set of resources during processing of the second iteration of task 204. Job tuning module 112 may determine whether to further adjust the second set of resources currently allocated to job 202 to a third set of resources, and may send a notification to job tuning service 110 with an applicable recommendation. Job tuning service 110 receives the notification from job tuning module 112 and provides a notification to scheduler 104 that causes scheduler 104 to adjust the second set of resources allocated to job 202 to the third set of resources for use in a third iteration of task 204. In this example, processing job 202 may include processing the third iteration of task 204.

IV. Example Methods

Figure 4:
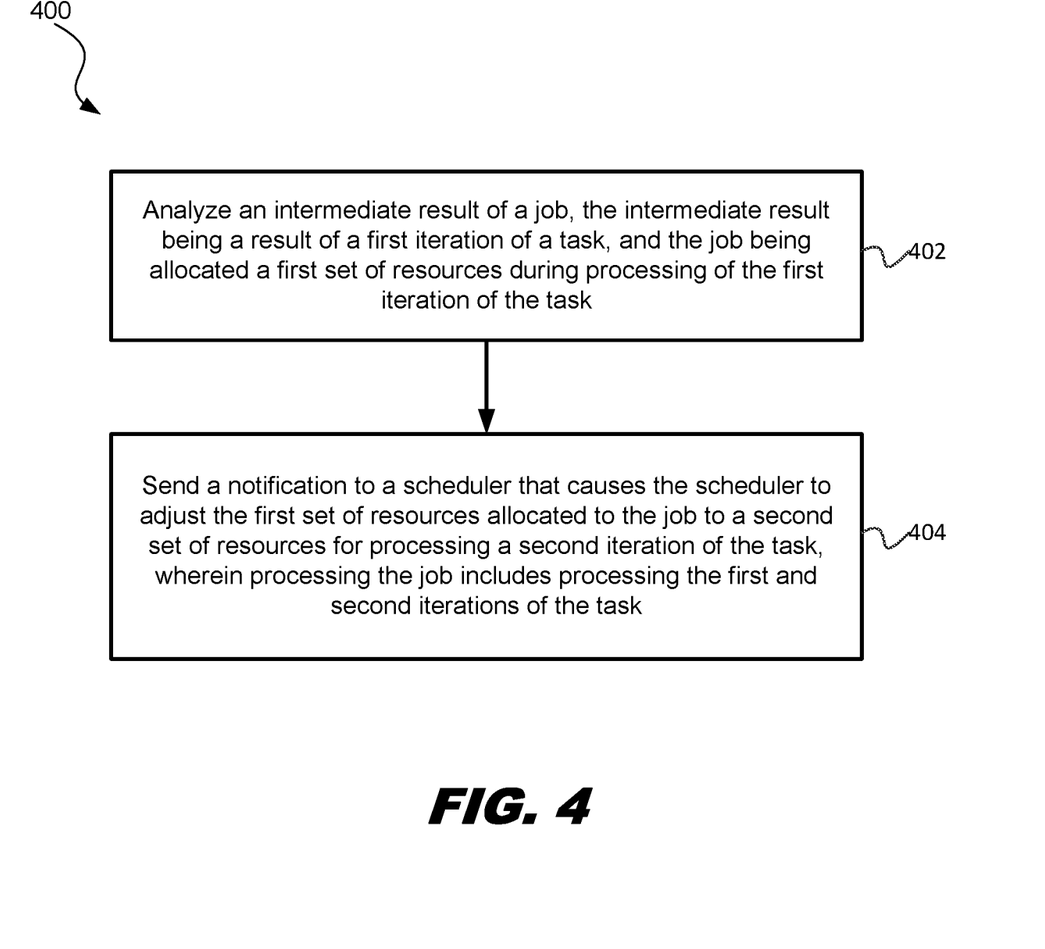
FIG. 4 is a flowchart illustrating an example method of adjusting the set of resources allocated for the running job.

FIG. 4 is a flowchart illustrating an example method 400 of adjusting a set of resources allocated for a job. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, blocks of method 400 may be performed on system 100 illustrated in FIG. 1. The order of the actions described below may also be performed according to alternative orderings. In yet other examples, additional actions may be added and actions that are described may be removed.

Method 400 includes blocks 402 and/or 404. In block 402, job tuning module 112 analyzes an intermediate result 312 of job 202, the intermediate result being a result of a first iteration of task 204, and the job being allocated first set of resources 310 during processing of the first iteration of task 204. Accordingly, the first iteration of task 204 may use first set of resources 310 allocated from computer virtual machine pool 114 by scheduler 104. In block 404, job tuning service 110 sends a notification to scheduler 104 that causes the scheduler to adjust first set of resources 310 allocated to job 202 to a second set of resources for processing a second iteration of task 204. Processing job 202 may include processing the first and second iterations of task 204. First set of resources 310 may be different from the second set of resources. It is understood that additional blocks may be performed before, during, or after blocks 402 and/or 404 discussed above.

Figure 5:
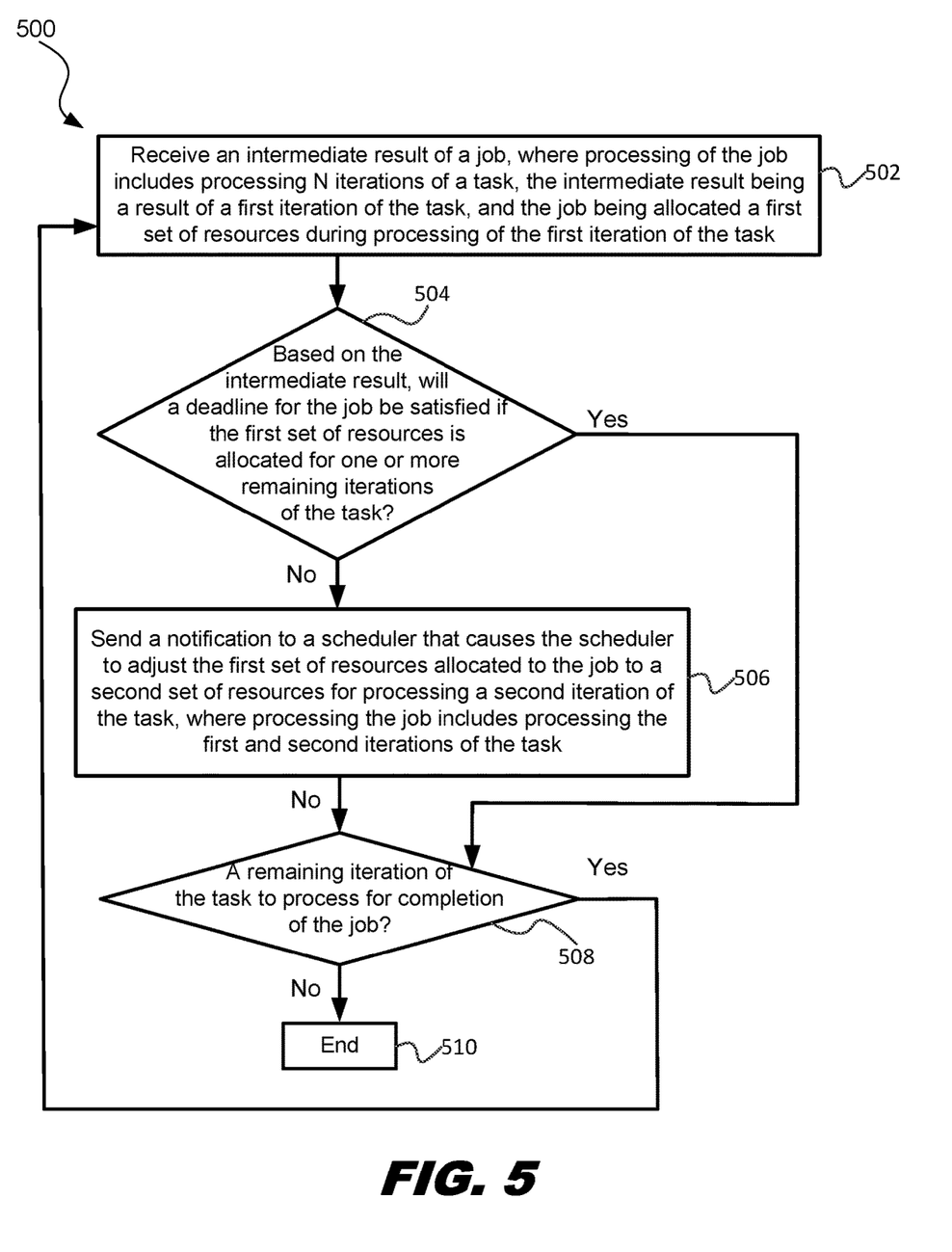
FIG. 5 is a flowchart illustrating another example method of adjusting the set of resources allocated for the running job.

FIG. 5 is a flowchart illustrating an example method 500 of adjusting a set of resources allocated for a running job. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, blocks of method 400 may be performed on system 100 illustrated in FIG. 1. The order of the actions described below may also be performed according to alternative orderings. In yet other examples, additional actions may be added and actions that are described may be removed.

Method 500 includes blocks 502, 504, 506, 508, and/or 510. In block 502, job tuning service 110 receives intermediate result 312 of job 202, where processing of the job includes processing N iterations of task 204. Intermediate result 312 is a result of a first iteration of task 204, and job 202 is allocated first set of resources 310 during processing of the first iteration of task 204. In block 504, based on intermediate result 312, job tuning module 112 determines whether a deadline for job 202 will be satisfied if first set of resources 310 is allocated for one or more remaining iterations of task 204. If so, process flow of method 500 proceeds to block 508, which is further discussed below. If not, process flow of method 500 proceeds to block 506, during which job tuning service 110 sends notification 320 to scheduler 104 that causes the scheduler to adjust first set of resources 310 allocated to job 202 to a second set of resources for processing a second iteration of task 204. In this example, processing job 202 includes processing the first and second iterations of task 204. This process may continue until processing of the job completes. In block 508, it is determined whether a remaining iteration of task 204 is to be processed for the completion of job 202. If so, process flow of method 500 proceeds to block 502. If not, process flow of method 500 proceeds to block 510, which is an end of method 500. It is understood that additional blocks may be performed before, during, or after blocks 502, 504, 506, 508, and/or 510 discussed above.

Figure 6:
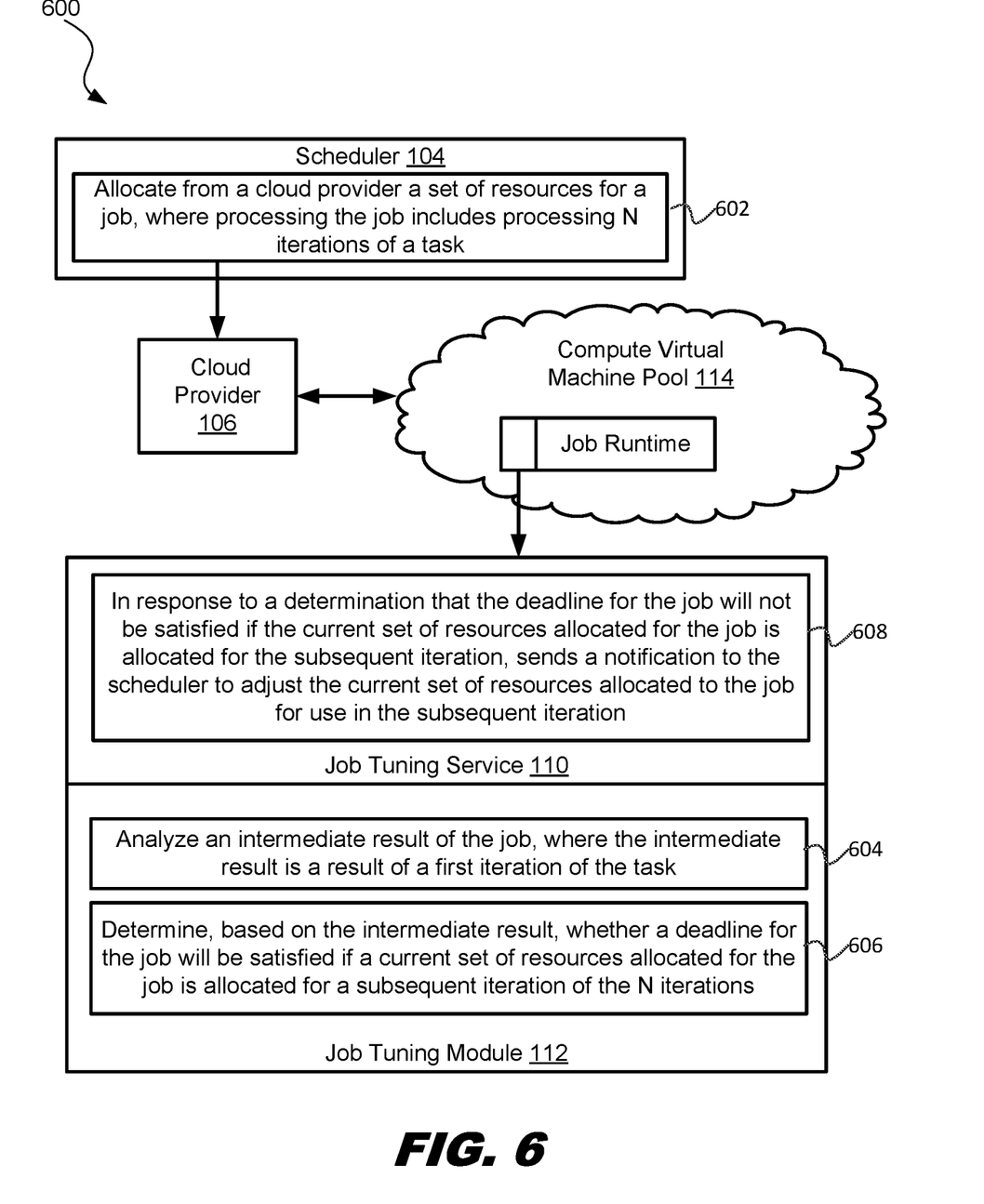
FIG. 6 is a diagram illustrating an example system for adjusting the set of resources allocated for the running job.

FIG. 6 is a diagram illustrating an example system 600 for adjusting a set of resources allocated for the running job. In FIG. 6, scheduler 104 allocates from cloud provider 106 first set of resources 310 for job 202, where processing the job includes processing N iterations of task 204. The job may produce one or more intermediate results. Additionally, job tuning module 112 analyzes an intermediate result of job 202, where the intermediate result is a result of a first iteration of task 204. Job tuning module 112 also determines, based on the intermediate result, whether a deadline for the job will be satisfied if a current set of resources allocated for the job is allocated for a subsequent iteration of the N iterations. In an example, in response to a determination that the deadline for the job will not be satisfied if the current set of resources allocated for the job is allocated for the subsequent iteration, job tuning service 110 sends a notification to the scheduler to adjust the current set of resources allocated to job 202 for use in the subsequent iteration. In this example, the notification causes scheduler 104 to increase the amount of resources allocated to job 202 such that next iteration of task 204 completes quicker than the previous iteration of the task.

As discussed above and further emphasized here, FIGS. 1-6 are merely examples, which should not unduly limit the scope of the claims. Although a single job is illustrated as being processed, it should be understood that more than one job may be run in compute virtual machine pool 114. Accordingly, system 100 may process multiple jobs. Additionally, each job may produce multiple intermediate results that are received by job tuning service 110 and analyzed by job tuning module 112.

In an example, job tuning module 112, job tuning service 110, and scheduler 104 are implemented in a tailored electrical circuit or as software instructions to be used in conjunction with a processor to create a hardware-software combination that implements the specific functionality described herein. To the extent that an example includes computer-executable instructions, those instructions may include software that is stored on a computer-readable medium. Each of job tuning module 112, job tuning service 110, and scheduler 104 may execute on a computing device including one or more processors and a memory. Each of job tuning module 112, job tuning service 110, and scheduler 104 may execute on different computing devices.

A computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the network (not shown). The network may be any type of network including a LAN, a WAN, an intranet, the Internet, a cloud, and/or any combination of networks thereof that is capable of interconnecting computing devices and/or computer programs in system 100.

Additionally, a computing device may include a bus or other communication mechanism for communicating information data, signals, and information between various components of computer system. The components may include an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (such as a keyboard, keypad, mouse, etc.). An audio I/O component may also be included to allow a user to use voice for inputting information by converting audio signals into information signals. Audio I/O component may allow the user to hear audio.

A transceiver or network interface may transmit and receive signals between the respective computing device and one or more other devices via a communications link to the network. In an example, the transmission is wireless, although other transmission mediums and methods may also be suitable. A processor, which may be a micro-controller, digital signal processor (DSP), or other processing component, processes these various signals, such as for display on the client device or transmission to other devices via the communications link. The processor may also control transmission of information, such as cookies or IP addresses, to other devices.

A computing device may execute specific operations by the processor and other components by executing one or more sequences of instructions contained in the system memory component. Logic may be encoded in a computer readable medium, which may refer to any medium that participates in providing instructions to the processor for execution. Such a medium may take many forms, including but not limited to, non-volatile media, volatile media, and transmission media. In an example, the logic is encoded in a non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In some examples, execution of instruction sequences (e.g., method 400 and/or 500) to practice the present disclosure may be performed by a computing device. In various other examples of the present disclosure, a plurality of machines coupled by the communications link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks, actions, or steps described herein may be changed, combined into composite blocks, actions, or steps, and/or separated into sub-blocks, sub-actions, or sub-steps to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method, comprising:
    receiving first resource information specifying a first set of resources allocated by a cloud provider for processing a job in a compute virtual machine pool, the job including a plurality of iterations of a task, identity of the tuning module, the first resource information including a first set of Internet Protocol (IP) addresses associated with a set of virtual machines (VMs), a first number of processors, and a second number of storage devices;
    receiving a deadline for completing the job;
    executing, using the first set of resources specified in the first resource information, a first iteration of the plurality of iterations, wherein the first iteration processes a first set of data using first logic, and wherein the executing produces an intermediate result of the job;
    with a job tuning service, searching a database to identify the job tuning module and invoking the job tuning module corresponding to the identity, the job tuning service being separate from the cloud provider and compute virtual machine pool, to determine, based on the deadline, a percentage of the plurality of iterations that has been completed after executing the first iteration, and a processing time for completion of the first iteration, whether the first set of resources is sufficient to complete the job in accordance with the deadline; and
    in response to a determination that the first set of resources is not sufficient:
        sending a notification to the cloud provider that causes the cloud provider to increase the first set of resources allocated to the job to a second set of resources;
        receiving second resource information specifying the second set of resources allocated by the cloud provider for processing the job in response to the notification; and
        executing, using the second set of resources specified in the second resource information, a second iteration of the plurality of iterations, wherein the second iteration processes a second set of data using the first logic, and the second set of data is different from the first set of data.

2. The method of claim 1, wherein determining whether the first set of resources is sufficient includes determining whether the percentage of the plurality of iterations completed is below a threshold, the method further including:
    in response to a determination that the percentage of the plurality of iterations completed is below the threshold, determining that the first set of resources is not sufficient to complete the job in accordance with the deadline.

3. The method of claim 1, further comprising:
    in response to a determination that the first set of resources is sufficient:
        sending a second notification that causes the cloud provider to decrease the first set of resources allocated to the job to a third set of resources;
        receiving third resource information specifying the third set of resources allocated by the cloud provider for processing the job in response to the second notification; and
        executing, using the third set of resources specified in the third resource information, the second iteration of the plurality of iterations, wherein the second iteration processes the second set of data using the first logic, and the second set of data is different from the first set of data.

4. The method of claim 1, further comprising:
    in response to a determination that the first set of resources is sufficient:
        sending a third notification that causes the cloud provider to maintain the first set of resources allocated to the job; and
        executing, using the first set of resources, the second iteration of the plurality of iterations, wherein the second iteration processes a second set of data using the first logic, and the second set of data is different from the first set of data.

5. The method of claim 1, further comprising:
    receiving the intermediate result at an endpoint.

6. The method of claim 5, wherein the endpoint is a uniform resource locator (URL).

7. The method of claim 1, wherein executing the first iteration includes using the set of virtual machines to execute the first iteration.

8. A system, comprising:
    a non-transitory memory; and
    one or more hardware processors coupled to the non-transitory memory and configured to read instructions from the non-transitory memory to cause the system to perform operations comprising:
        receiving first resource information specifying a first set of resources allocated by a cloud provider for processing a job in a compute virtual machine pool, the job including a plurality of iterations of a task, identity of the tuning module, the first resource information including a first set of Internet Protocol (IP) addresses associated with a set of virtual machines (VMs), a first number of processors, and a second number of storage devices;

receiving a deadline for completing the job;

executing, using the first set of resources specified in the first resource information, a first iteration of the plurality of iterations, wherein the first iteration processes a first set of data using first logic, and wherein the executing produces an intermediate result of the job;

with a job tuning service, searching a database to identify the job tuning module and invoking the job tuning module corresponding to the identity, the job tuning service being separate from the cloud provider and compute virtual machine pool, to determine, based on the deadline, a percentage of the plurality of iterations that has been completed after executing the first iteration, and a processing time for completion of the first iteration, whether the first set of resources is sufficient to complete the job in accordance with the deadline; and in response to a determination that the first set of resources is sufficient:
  sending a notification to the cloud provider that causes the cloud provider to decrease the first set of resources allocated to the job to a second set of resources;
  receiving second resource information specifying the second set of resources allocated by the cloud provider for processing the job in response to the notification; and
  executing, using the second set of resources specified in the second resource information, a second iteration of the plurality of iterations, wherein the second iteration processes a second set of data using the first logic, and the second set of data is different from the first set of data.

9. The system of claim 8, wherein the intermediate result indicates the percentage of the plurality of iterations completed based at least on executing the first iteration.

10. The system of claim 8, wherein the instructions from the non-transitory memory further cause the system to perform operations comprising:
  determining whether the percentage of the plurality of iterations is below a threshold; and
  determining that the first set of resources is sufficient to complete the job in response to a determination that the percentage of the plurality of iterations is not below the threshold.

11. The system of claim 10, wherein the instructions from the non-transitory memory further cause the system to perform operations comprising:
  determining that the first set of resources is not sufficient to complete the job in response to a determination that the percentage of the plurality of iterations is below the threshold.

12. The system of claim 8, wherein the first set of resources includes a first quantity of resources of a first type, and the second set of resources includes a second quantity of resources of the first type.

13. The system of claim 12, wherein the first quantity is greater than the second quantity.

14. The system of claim 8, wherein the instructions from the non-transitory memory further cause the system to perform operations comprising:
  determining whether a processing time of the first iteration is below a threshold; and
  determining that the first set of resources is sufficient to complete the job in accordance with the deadline in response to a determination that the processing time is not below the threshold.

15. The system of claim 14, wherein the instructions from the non-transitory memory further cause the system to perform operations comprising:
  determining that the first set of resources is not sufficient to complete the job in accordance with the deadline in response to a determination that the processing time is below the threshold.

16. The system of claim 8, wherein the intermediate result indicates the plurality of iterations completed based at least on executing the first iteration.

17. The system of claim 8, wherein executing the first iteration includes using the set of virtual machines to execute the first iteration.

18. A non-transitory machine-readable medium comprising a plurality of machine-readable instructions that when executed by one or more processors is adapted to cause the one or more processors to perform a method comprising:
  receiving first resource information specifying a first set of resources allocated by a cloud provider for processing a job in a compute virtual machine pool, the job including a plurality of iterations of a task, identity of the tuning module, the first resource information including a first set of Internet Protocol (IP) addresses associated with a set of virtual machines (VMs), a first number of processors, and a second number of storage devices;
  receiving a deadline for completing the job;
  executing, using the first set of resources specified in the first resource information, a first iteration of the plurality of iterations, wherein the first iteration processes a first set of data using first logic, and wherein the executing produces an intermediate result of the job;
  with a job tuning service, searching a database to identify the job tuning module and invoking the job tuning module corresponding to the identity, the job tuning service being separate from the cloud provider and compute virtual machine pool, to determine, based on the deadline, a percentage of the plurality of iterations that has been completed after executing the first iteration, and a processing time for completion of the first iteration, whether the first set of resources is sufficient to complete the job in accordance with the deadline; and
  in response to a determination that the first set of resources is not sufficient:
    sending a notification to the cloud provider that causes the cloud provider to adjust the first set of resources allocated to the job to a second set of resources;
    receiving second resource information specifying the second set of resources allocated by the cloud provider for processing the job in response to the notification; and
    executing, using the second set of resources specified in the second resource information, a second iteration of the plurality of iterations, wherein the second iteration processes a second set of data using the first logic, and the second set of data is different from the first set of data.

19. The non-transitory machine-readable medium of claim 18, wherein sending the notification includes sending a notification that causes the cloud provider to increase the first set of resources allocated to the job to the second set of resources.

20. The non-transitory machine-readable medium of claim 18, wherein sending the notification includes sending a notification that causes the cloud provider to decrease the first set of resources allocated to the job to the second set of resources.

\* \* \* \* \*